(12) United States Patent
Kang et al.

(10) Patent No.: US 11,841,592 B2
(45) Date of Patent: Dec. 12, 2023

(54) DISPLAY PANEL AND DISPLAY DEVICE

(71) Applicants: Beihai HKC Optoelectronics Technology Co., Ltd., Beihai (CN); HKC CORPORATION LIMITED, Shenzhen (CN)

(72) Inventors: Chihtsung Kang, Beihai (CN); Haijiang Yuan, Beihai (CN)

(73) Assignees: BEIHAI HKC OPTOELECTRONICS TECHNOLOGY CO., LTD., Beihai (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/971,846

(22) Filed: Oct. 24, 2022

(65) Prior Publication Data

US 2023/0128471 A1  Apr. 27, 2023

(30) Foreign Application Priority Data

Oct. 25, 2021  (CN) .......................... 202111239827.4

(51) Int. Cl.
*G02F 1/1343* (2006.01)
*G02F 1/1335* (2006.01)
*G02F 1/13357* (2006.01)

(52) U.S. Cl.
CPC .. *G02F 1/134363* (2013.01); *G02F 1/133531* (2021.01); *G02F 1/133605* (2013.01)

(58) Field of Classification Search
None
See application file for complete search history.

(56) References Cited

U.S. PATENT DOCUMENTS

| | | | | |
|---|---|---|---|---|
| 2007/0195409 A1* | 8/2007 | Yun | ......................... | G02B 30/29 359/462 |
| 2008/0284715 A1 | 11/2008 | Kawata | | |
| 2014/0049706 A1* | 2/2014 | Park | ....................... | G02B 30/29 349/200 |
| 2015/0185487 A1* | 7/2015 | Lee | ......................... | G02B 30/28 349/15 |

(Continued)

FOREIGN PATENT DOCUMENTS

| | | |
|---|---|---|
| CN | 101038350 A | 9/2007 |
| CN | 201083843 Y | 7/2008 |

(Continued)

*Primary Examiner* — Shan Liu
(74) *Attorney, Agent, or Firm* — Maier & Maier, PLLC

(57) ABSTRACT

A display panel and a display device. The display panel includes a first light adjusting module and a display module. The display module includes a pixel unit having a plurality of pixels, the pixels include a plurality of sub-pixels. The first light adjusting module includes a first light-adjusting electrode layer, a second light-adjusting electrode layer, a first filling layer and a second filling layer. The first filling layer is filled with a first filling material with a refractive index of ns, and the second filling layer is filled with filler groups each including at least one filler and corresponding to the pixels. The refractive index ne of the filler along the second direction is greater than the refractive index no along the third direction thereof, and ns≈no. The fillers in the same filler group switches between a first deflected state and a second deflected state.

18 Claims, 8 Drawing Sheets

(56) References Cited

U.S. PATENT DOCUMENTS

2016/0093255 A1* 3/2016 Aoki .................. G06F 3/04166
345/88

FOREIGN PATENT DOCUMENTS

| DE | 102015012271 A1 | 4/2017 |
| GB | 2428100 A | 1/2007 |
| WO | WO-2022255246 A1 * | 12/2022 |

* cited by examiner

DISPLAY PANEL AND DISPLAY DEVICE

CROSS-REFERENCE TO RELATED APPLICATIONS

This application claims the benefit of Chinese patent application No. 202111239827.4 filed on Oct. 25, 2021, the contents of which are incorporated herein by reference.

TECHNICAL FIELD

The present application relates to display technology, and in particular, to a display panel and a display device.

BACKGROUND

In a display device, a backlight source with a light energy distribution having a relatively large viewing angle is used in order to obtain a wide-angle display. Since the incident light onto a display panel from the backlight source has a certain angle, a display with a larger viewing angle can be obtained. However, due to the large angle of the light, light leakage resulted from the light transmitted through a pixel that should not be displayed while an adjacent pixel displays may occur.

By using a backlight source with a light energy distribution having a relatively narrow viewing angle, such as a collimated backlight, the light is allowed to pass perpendicularly through pixels of the display panel, so that the light transmission through the non-display pixel adjacent to the displayed pixel is avoided, thereby reducing the light leakage. However, display devices with this type of backlight source have a small effective viewing range so that a wide-angle display cannot be realized.

Therefore, conventional display devices are unable to reduce light leakage while providing a wide-angle display.

SUMMARY

An embodiment of the present application provides a display panel, by arranging a filler corresponding to a respective pixel, a deflected state of the filler corresponding to the pixel varies according to a display status of the pixel, so as to realize a display device with a wide viewing angle and reduced light leakage.

The present application adopts the following technical proposals: a display panel, which includes:

a first light adjusting module, and a display module facing the first light adjusting module along a first direction, the display module including a pixel unit, the pixel unit having a plurality of pixels, and each one of the plurality of pixels including a plurality of sub-pixels.

The first light adjusting module includes a first light-adjusting electrode layer, a second light-adjusting electrode layer, a first filling layer and a second filling layer. The second filling layer is disposed on an incident side of the first filling layer, and the first light-adjusting electrode layer and the second light-adjusting electrode layer are respectively located on two sides of the second filling layer. The first filling layer is filled with a first filling material with a refractive index of ns, and the second filling layer is filled with a second filling material.

The second filling material includes a plurality of filler groups, and each one of the pixels corresponds to at least one of the filler groups. Each one of the filler groups includes at least one filler, and the filler has a refractive index of ne along a second direction, and a refractive index of no along a third direction, where ne>no, and ns≈no.

An electric field for switching a state of the filler in the filler groups corresponding to the pixels is formed between the first light-adjusting electrode layer and the second light-adjusting electrode layer. The state of the filler includes at least a first deflected state and a second deflected state. The second direction of the filler coincides with a vibration direction of an incident light entering the second filling layer when the filler is in the first deflected state, and the third direction of the filler coincides with the vibration direction of the incident light entering the second filling layer when the filler is in the second deflected state.

In an embodiment, the first filling material are formed with a plurality of accommodating grooves, and each one of the accommodating grooves is used for accommodating one of the filler groups.

In an embodiment, a difference between ne and no is in a range of 0.01-2, with a value of ne between 1.0 and 2.5, and a value of no between 1.0 and 2.5.

In an embodiment, the first filling material is a polymer material, the second filling material is a nematic liquid-crystal-molecule material, and the filler is a liquid crystal molecule.

In an embodiment, the first light adjusting module further includes a first transparent substrate and a second transparent substrate, the first transparent substrate is located on a light-exiting side of the first light-adjusting electrode layer, and the second transparent substrate is located on an incident side of the second light-adjusting electrode layer.

In an embodiment, the number of the filler groups corresponding to one of the pixels is the same as the number of the sub-pixels in the one of the pixels, namely each of the sub-pixels corresponds to one of the filler groups.

The electric field formed between the first light-adjusting electrode layer and the second light-adjusting electrode layer is used for driving all the fillers in a respective filler group to switch between the first deflected state and the second deflected state when an activated state of the sub-pixel corresponding to the respective filler group is changed.

In an embodiment, the first light adjusting module is disposed on a light-exiting side of the display module. The display panel further includes a second light adjusting module disposed on an incident side of the display module, and the second light adjusting module is used for adjusting a luminance of the light entering the display module.

In an embodiment, a first light adjusting module is disposed on the incident side of the display module. The display module includes a first polarizing sheet and a second polarizing sheet, and the first light adjusting module includes a third polarizing sheet. The first polarizing sheet is positioned on a light-exiting side of the pixel unit, the second polarizing sheet is positioned on an incident side of the pixel unit, and the third polarizing sheet is positioned on an incident side of the second light-adjusting electrode layer. A transmission axis of the third polarizing sheet is orthogonal to a transmission axis of the second polarizing sheet.

The present application further provides a display device, which includes a backlight source and the display panel according to any of the above-mentioned technical proposals, the backlight source is disposed on an incident side of the display panel, and the backlight source is a collimated light source.

In an embodiment, the backlight source includes a light source, an optical film, a light-guiding plate and a reflective sheet. The optical film is located between the light-guiding plate and the display panel. The light source is disposed to a side of the light-guiding plate, and the reflective sheet is located on a side of the light-guiding plate facing away from the display panel. A plurality of first V-shaped grooves arranged side by side are provided on a side of the light-guiding plate facing the optical film, and a plurality of second V-shaped grooves arranged side by side are provided on the side of the light-guiding plate facing the reflective sheet. The first V-shaped grooves are extended along a direction parallel to an emission direction of the light from the light source, and the second V-shaped grooves are extended along a direction perpendicular to the direction along which the first V-shaped grooves are extended.

The display panel provided by the present application has the following beneficial effects: during the operation of the display panel provided by the present application, when a pixel in the pixel unit is activated as in the activated state, the electric field between the first light-adjusting electrode layer and the second light-adjusting electrode layer forces all the fillers in the filler group corresponding to the pixel to rotate, such that the refractive index of the fillers is ne as the incident light entering the first light adjusting module passes through the fillers. The light passing through the fillers is refracted when entering the first filling layer due to the refractive index of the first filling material in the first filling layer is ns, where ne>ns, so that the display panel can realize a large-viewing-angle display. When a pixel in the pixel unit is not activated or is in a dark state, the electric field between the first light-adjusting electrode layer and the second light-adjusting electrode layer forces the fillers in the filler group corresponding to the pixel to rotate, such that the refractive index of the fillers is no as the incident light entering the first light adjusting module passes through the fillers. The light passing through the fillers is refracted when entering the first filling layer due to the refractive index of the first filling material in the first filling layer is ns, where no=ns, thereby preventing light leakage.

In the display panel provided by the present application, the filling layer is controlled, thus a refraction angle of the light emitted from the first light adjusting module is accordingly controlled, based on the activation of the corresponding pixel. Therefore, the display angle is increased as the light passing through the activated pixel is refracted, and the light leakage is reduced as the light reaching the inactivated pixels is not refracted, so that both the wide-angle display and the prevention of the light leakage can be realized.

The display device provided by the present application includes the display panel according to the above-mentioned technical proposals, and therefore at least has the beneficial effects of the above-mentioned display panel, which will not be repeated herein.

BRIEF DESCRIPTION OF THE DRAWINGS

In order to more clearly illustrate the technical proposals in embodiments of the present application, accompanying drawings that are used in the description of the embodiments or exemplary technologies are briefly introduced hereinbelow. Obviously, the drawings in the following description are merely some embodiments of the present application. For those skilled in the art, other drawings can also be obtained according to these drawings without any creative effort.

DETAILED DESCRIPTION OF THE EMBODIMENTS

In order to make the purpose, technical proposals, and advantages of the present application more clearly understood, the present application will be described in further detail hereinbelow with reference to the accompanying drawings and embodiments. It should be understood that the specific embodiments described herein are merely used to explain the present application, but not to limit the present application.

It should be noted that when an element is referred to as being "fixed to" or "arranged on" another element, it can be directly or indirectly on the other element. When an element is referred to as being "connected to" another element, it can be directly connected to the other element or indirectly connected to the other element.

It is to be understood that the terms "length", "width", "upper", "lower", "front", "rear", "left", "right", "vertical", "horizontal", "top", "bottom", "inside", "outside", etc. for indicating orientations or positional relationships refer to orientations or positional relationships as shown in the accompanying drawings; the terms are for the purpose of illustrating the present application and simplifying the description rather than indicating or implying the device or element must have a certain orientation and be structured or operated by the certain orientation, and therefore cannot be regarded as limitation to the present application.

Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the present application, unless otherwise indicated, the meaning of "plural" is two or more than two.

In order to illustrate the technical proposals described in the present application, a detailed description is given below with reference to the drawings and embodiments.

First Embodiment

Figure 1:
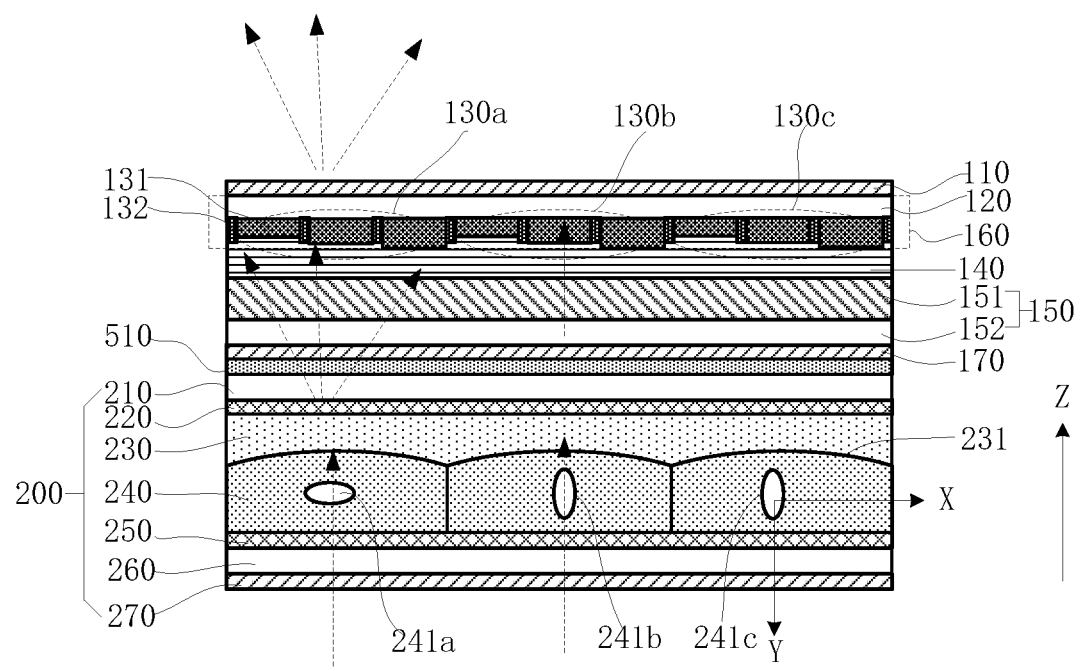
FIG. 1 is a structural schematic diagram of a display panel according to a first embodiment of the present application.

As shown in FIG. 1, the present application provides a display panel, which includes a first light adjusting module 200 and a display module 100 facing each other along a first direction. The first direction coincides with a light-exiting direction of the backlight source in the display device, and is indicated by arrow Z in FIG. 1. In this embodiment, the light has a propagation direction and a vibration direction, thus the incident side and the light-exiting side of each structure are defined according to the light propagation direction. For instance, when a collimated light source is disposed on one side of the display module 100, the light emitted by the collimated light source passes through the display module 100 in the first direction, that is, the propagation direction of the light is the same as the first direction. In this embodiment, the first light adjusting module 200 is disposed on the incident side of the display module 100. The display module 100 includes a pixel unit having a plurality of pixels 130, and each of the pixels 130 includes a plurality of sub-pixels (three sub-pixels, namely a first sub-pixel 130a, a second sub-pixel 130b and a third sub-pixel 130c, are shown in FIG. 1).

The first light adjusting module 200 includes a first light-adjusting electrode layer 220, a second light-adjusting electrode layer 250, a first filling layer 230 and a second filling layer 240. The second filling layer 240 is disposed on the incident side of the first filling layer 230, and the first light-adjusting electrode layer 220 and the second light-adjusting electrode layer 250 are respectively located on two sides of the second filling layer 240. Specifically, the first light-adjusting electrode layer 220, the first filling layer 230, the second filling layer 240 and the second light-adjusting electrode layer 250 may be arranged in sequence along the first direction, that is, the first filling layer 230 and the second filling layer 240 are both disposed between the first light-adjusting electrode layer 220 and the second light-adjusting electrode layer 250. Alternatively, the first filling layer 230, the first light-adjusting electrode layer 220, the second filling layer 240 and the second light-adjusting electrode layer 250 may be arranged in sequence along the first direction, that is, only the second filling layer 240 is disposed between the first light-adjusting electrode layer 220 and the second light-adjusting electrode layer 250.

The first filling layer 230 is filled with a first filling material having a refractive index of ns. The second filling layer 240 is filled with a second filling material, and the second filling material includes a plurality of filler groups. Each one of the pixels 130 corresponds to at least one of the filler groups, and each one of the filler groups includes at least one filler 241 which is anisotropic. The refractive index of the filler 241 with respect to light having the same vibration direction varies according to different deflection angles of the filler 241. The refractive index of the filler 241 along the second direction equals to the extraordinary refractive index (ne, the equivalent refractive index when the optical axis is parallel to the electric field), that is, the refractive index of the filler 241 is ne when the vibration direction of the light passing therethrough is parallel to the second direction of the filler 241. The refractive index of the filler 241 along the third direction equals to the ordinary refractive index (no, the equivalent refractive index when the optical axis is perpendicular to the electric field), that is, the reflective index of the filler 241 is no when the vibration direction of the light passing therethrough is parallel to the third direction of the filler 24. Skeptically, ne>no, and ns≈no, where ns may exactly equal to no, or, the difference between ns and no is negligible, so that the light passing through the structure with a refractive index of ns and the structure with a refractive index of no in sequence is not refracted.

Optionally, the value of ne is in a range of 1.0-2.5, the value of no is in a range of 1.0-2.5, and the difference between ne and no is in a range of 0.01-2, namely the value obtained by subtracting no from ne falls in the range of 0.01-2. For instance, no may be 2.49, 2.0, 1.5, or 0.5 when ne is 2.5.

The second filling material includes uniaxial materials having different refractive indices with respect to different directions, and the refractive index of the uniaxial materials varies according to different deflection angles.

Optionally, the first filling material is a polymer material. Optionally, the second filling material is a nematic liquid crystal molecule material, and the filler 241 is a liquid crystal molecule. Liquid crystal molecules are anisotropic, with the direction along long axes thereof being the second direction, and the direction along short axes thereof being the third direction.

The second direction and the third direction are the directions along different axes of the filler 241, that is, the second direction and the third direction correspond to the orientation of the filler 241, and the second direction and the third direction changes in accordance with the deflection of the filler 241. For example, as shown in FIG. 1, fillers 241 in FIG. 1 have an elliptical shape, and the second direction and the third direction of one of the fillers 241 are indicated by arrows, specifically, the second direction of the filler 241 is indicated by arrow Y, and the third direction is indicated by arrow X. That is, when a cross section of the filler 241 is in an elliptical shape, the second direction is along the direction of the long axis, and the third direction is along the direction of the short axis. The second direction of the filler 241 is perpendicular to the horizontal plane, and the third direction is parallel to the horizontal plane when the long axis of the filler 241 is perpendicular to the horizontal plane. The second and third directions change when the filler 241 is deflected, for instance, such that the long axis thereof is parallel to the horizontal plane, thus the second direction is also parallel to the horizontal plane, and the third direction is perpendicular to the horizontal plane.

An electric field is formed between the first light-adjusting electrode layer 220 and the second light-adjusting electrode layer 250, and the electric field is used for switching a state of all of the fillers 241 in the filler groups corresponding to the pixels 130, and the state of the fillers 241 include at least a first deflected state and a second deflected state. Specifically, when the pixels 130 are in the activated state, the first light-adjusting electrode layer 220 and the second light-adjusting electrode layer 250 enable all of the fillers 241 in the filler groups corresponding to the pixels 130 to be in the first deflected state, that is, the second direction of all the fillers 241 in the filler groups corresponding to the pixels 130 is parallel to the vibration direction of the light. At this time, the refractive index of the fillers 241 is ne as the light entering the second filling layer 240, and the light passing through the fillers 241 further passes through the first filling layer 230. Since the refractive index of the first filling material in the first filling layer 230 is ns, and ne>ns, so that the light is refracted, and the propagation direction of the light changes, thereby achieving a large-viewing-angle display. When the pixels 130 are in an inactivated state or a dark state, the first light-adjusting electrode layer 220 and the second light-adjusting electrode layer 250 enable all the fillers 241 in the filler groups corresponding to the pixels 130 to be in the second deflected state, so that the third direction of the fillers 241 in the filler groups corresponding to the pixels 130 is parallel to the vibration direction of the light entering the second filling layer 240. At this time, the refractive index of the fillers 24 is no, and the light passing through the fillers 241 further passes through the first filling layer 230. Since the refractive index of the first filling material in the first filling layer 230 is ns, and no ns, thus the light is not refracted, namely the propagation direction of the light does not change, thereby avoiding the light leakage. In summary, in the display panel provided by the present embodiment, the electric field can be adjusted through the first light-adjusting electrode layer 220 and the second light-adjusting electrode layer 250, so that the fillers 241 in the filler groups corresponding to the pixels 130 under different states are able to be deflected by different angles or the same angle. The light is allowed to be adjusted at a scale of the pixels 130, thus the light corresponding to the activated pixels 130 can be emitted at a wide angle, and the light corresponding to the inactivated pixels 130 is not refracted to avoid light leakage.

The display panel provided in this embodiment is applicable in a display device, especially a display device including a collimated light source. Light leakage can be reduced by combining the display panel with a collimated light source due to the narrow incident angle of the collimated light source, thereby realizing a wide-angle displaying effect.

As shown in FIG. 1, in this embodiment, one filler group is provided corresponding to each pixel 130, and each filler group includes one or more fillers 241.

In FIG. 1, the display module 100 includes a first color film substrate 160 and a first array substrate 150. The first color film substrate 160 includes a third transparent substrate 120 and a pixel unit disposed on the third transparent substrate 120. The pixel unit includes a plurality of pixels 130. One pixel 130 includes three sub-pixels 131 in FIG. 1. A black matrix 132 is disposed on the third transparent substrate 120, for defining a display area and a non-display area on the third transparent substrate 120. The area blocked by the black matrix 132 is the non-display area, and the area not blocked by the black matrix 132 is the display area, and the sub-pixels 131 are arranged in the display area. The first array substrate 150 includes a fourth transparent substrate 152 and an array layer 151, and the array layer 151 includes a metal and semiconductor element which is disposed on the fourth transparent substrate 152. A liquid-crystal display layer 140 is filled between the first color film substrate 160 and the first array substrate 150.

Furthermore, the display module 100 further includes a first polarizing sheet 110 disposed on the light-exiting side of the pixel unit, and a second polarizing sheet 170 disposed on the incident side of the pixel unit. Specifically, the first polarizing sheet 110 is disposed on the light-exiting side of the third transparent substrate 120, and the second polarizing sheet 170 is disposed on the incident side of the fourth transparent substrate 152.

As shown in FIG. 1, the first light adjusting module 200 further includes a third polarizing sheet 270 disposed on the incident side of the second light-adjusting electrode layer 250, and the transmission axis of the third polarizing sheet 270 is orthogonal to the transmission axis of the second polarizing sheet 170.

By this configuration, the energy of the light passing through the third polarizing sheet 270 is reduced to a certain extent. In correspondence to the pixel 130 in the inactivated state or the dark state, the light is not refracted when passing through the first light adjusting module 200, and the light in the region corresponding to the pixel 130 is absorbed at the second polarizing sheet 170 due to the transmission axes of the second polarizing sheet 170 and the third polarizing sheet 270 are orthogonal, so that the light is not emitted outward, thereby further reducing the light leakage.

In an embodiment, the transmission direction of the third polarizing sheet 270 is horizontal polarization, that is, the light vibrating along the horizontal direction in the incident light is able to continue to propagate along the propagation direction thereof, while the light vibrating along the vertical direction is blocked by the third polarizing sheet 270 and cannot continue to propagate. With such configuration, the vibration direction of the light passing through the third polarizing sheet 270 is in the horizontal direction. The refractive index of the fillers 241 with respect to the light is the reflective index along the second direction, ne, if the second direction of the filling body 241 is in the horizontal direction, and the refractive index of the fillers 241 with respect to the light is the refractive index along the third direction, no, if the third direction of the fillers 241 is in the horizontal direction.

For the ease of demonstrating the deflection angle of the fillers 241, in FIG. 1, only one filler 241 is shown in each filler group, and the deflection angle of the one filler 241 represents the deflection angle of all fillers 241 in that filler group.

In FIG. 1, each pixel 130 includes three sub-pixels 131, and three pixels 130 are shown in FIG. 1, and one filler group is correspondingly arranged with respect to each pixel 130. The cross section of the filler 241 in the filler group is in an elliptical shape, with the direction along a long axis thereof being the second direction, and the direction along a short axis direction thereof being the third direction. For convenience of description, the three pixels 130 shown in FIG. 1 are respectively referred to as the first pixel 130a, the second pixel 130b and the third pixel 130c from left to right, and the filler 241 in the filler group corresponding to the first pixel 130a is the first filler 241a, the filler 241 corresponding to the second pixel 130b is the second filler 241b, and the filler 241 corresponding to the third pixel 130c is the third filler 241c.

In FIG. 1, the first direction is vertically upward as indicated by arrow Z, and the propagation direction of the light is in the first direction. The third polarizing sheet 270 is horizontal polarization, which means the transmission direction of the third polarizing sheet 270 is in the horizontal direction, that is, only the light vibrating along the horizontal direction is able to pass through the third polarizing sheet 270. The first pixel 130*a* is in an activated state, and the second pixel 130*b* and the third pixel 130*c* are in an inactivated state. Correspondingly, under the electric field formed by the first light-adjusting electrode layer 220 and the second light-adjusting electrode layer 250, the second direction of the first filler 241*a* is extended along the vertical direction, namely the second direction of the first filler 241*a* is parallel to the horizontal direction. In other words, the second direction of the first filler 241*a* is parallel to the vibration direction of the light passing through the second filling layer 240, and the second direction is orthogonal to the first direction. Therefore, the refractive index of the first filler 241*a* with respect to the light passing therethrough is ne. The second directions of both of the second filler 241*b* and the third filler 241*c* are extended along the vertical direction, namely the second directions are parallel to the first direction, and the third directions of the second filler 241*b* and the third filler 241*c* are parallel to the horizontal direction. In other words, the third directions of the second filler 241*b* and the third filler 241*c* is parallel to the vibration direction of the light passing through the second filling layer 240. Therefore, the refractive indices of the second filler 241*b* and the third filler 241*c* with respect to the light passing through the second filling layer 240 are both no. In FIG. 1, the second direction of the third filler 241*c* is indicated by arrow Y, and the third direction is indicated by arrow X.

The propagation direction of the emitted light onto the display panel is indicated by the dashed arrow in FIG. 1.

When the light emitted from the light source 410 corresponding to the display panel is transmitted onto the first light adjusting module 200 in a vertically upward direction (the light propagation direction), the vertically upward light in the area corresponding to the second pixel 130*b* and the third pixel 130*c* is not refracted when passing through the second filling layer 240 and the first filling layer 230, still exiting in the upward direction. Since the transmission axis of the second polarizing sheet 170 is orthogonal to the transmission axis of the third polarizing sheet 270, the vertically upward light that passes through the third polarizing sheet 270 is absorbed by the second polarizing sheet 170 and will not be transmitted to the first pixel 130*a*. Whereas in the area corresponding to the first pixel 130*a*, the light propagating vertically upward is refracted when passing through the second filling layer 240 and the first filling layer 230, so that the light is diffracted and emitted. The refracted light passes through the second polarizing sheet 170 and further exits the display panel, which enables the area corresponding to the first pixel 130*a* to present a wide-angle effect.

In order to separate different filler groups, a plurality of accommodating grooves 231 are formed by the first filling material, each being used for accommodating one filler group. As shown in FIG. 1, an accommodating groove 231 is arranged corresponding to one pixel 130 in the first filling layer 230, and the accommodating groove 231 is used for accommodating the filler group corresponding to the pixel 130.

The cross section of the accommodating groove 231 may be circular, rectangular, trapezoidal or in other shapes. For example, when the cross section of the accommodating groove 231 is circular, an inner cavity of the accommodating groove 231 is in a cylindrical shape.

In order to control different filler groups, the first light-adjusting electrode layer 220 includes a plurality of first electrodes, and the second light-adjusting electrode layer 250 includes a plurality of second electrodes. At least one first electrode and at least one second electrode are respectively disposed on two sides of a filler group, and the electric field in the area of the filler group is controlled by the corresponding first and the second electrodes, so that a more precise control of the filler 241 in the filler group can be achieved.

An indium tin oxide (ITO) conductive electrode may be used as the first electrode and the second electrode.

The first light adjusting module 200 further includes a first transparent substrate 210 and a second transparent substrate 260, the first light-adjusting electrode layer 220 is mounted on the first transparent substrate 210, and the second light-adjusting electrode layer 250 is mounted on the second transparent substrate 260. Specifically, the first transparent substrate 210 is located on the light-exiting side of the first light-adjusting electrode layer 220, and the second transparent substrate 260 is located on the incident side of the second light-adjusting electrode layer 250.

In this embodiment, a glass plate may be utilized as the first transparent substrate 210, the second transparent substrate 260, the third transparent substrate 120 and the fourth transparent substrate.

In the present application, the display module 100 and the first light adjusting module 200 are adhered by a first adhesive layer, and the first adhesive layer may be an optically clear adhesive (OCA), which is colorless and transparent with a high optical transmission and good bonding strength.

In an embodiment, the first adhesive layer is located between the first transparent substrate 210 and the second polarizing sheet 170.

Second Embodiment

Figure 2:
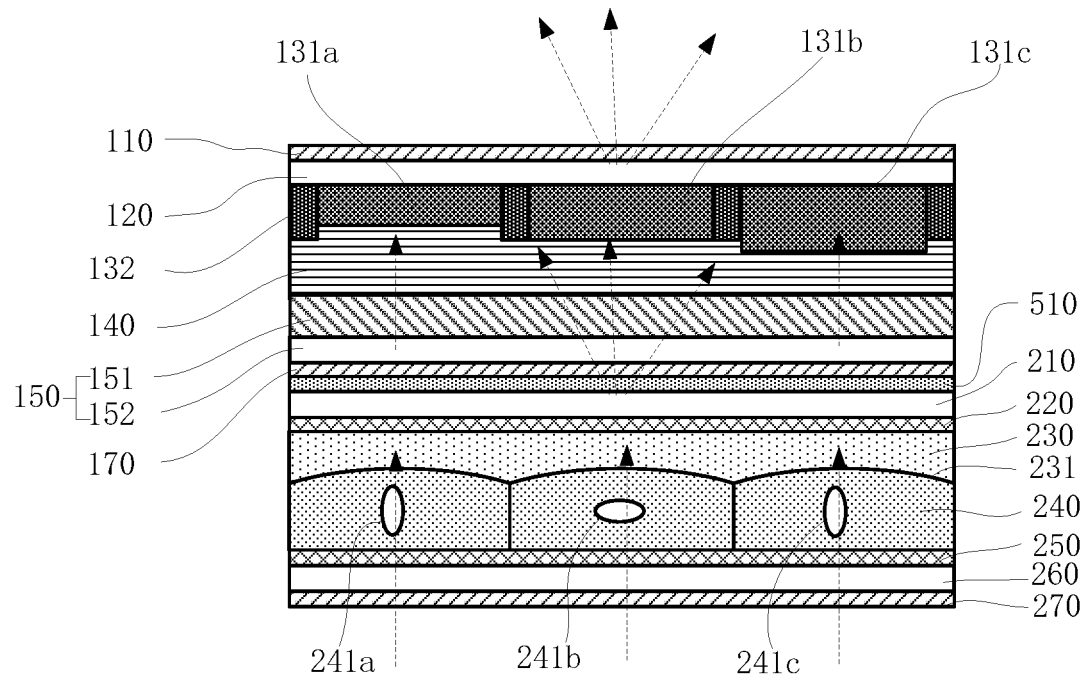
FIG. 2 is a structural schematic diagram of a display module and a first light adjusting module of the display panel under a first operation state according to a second embodiment of the present application.
Figure 3:
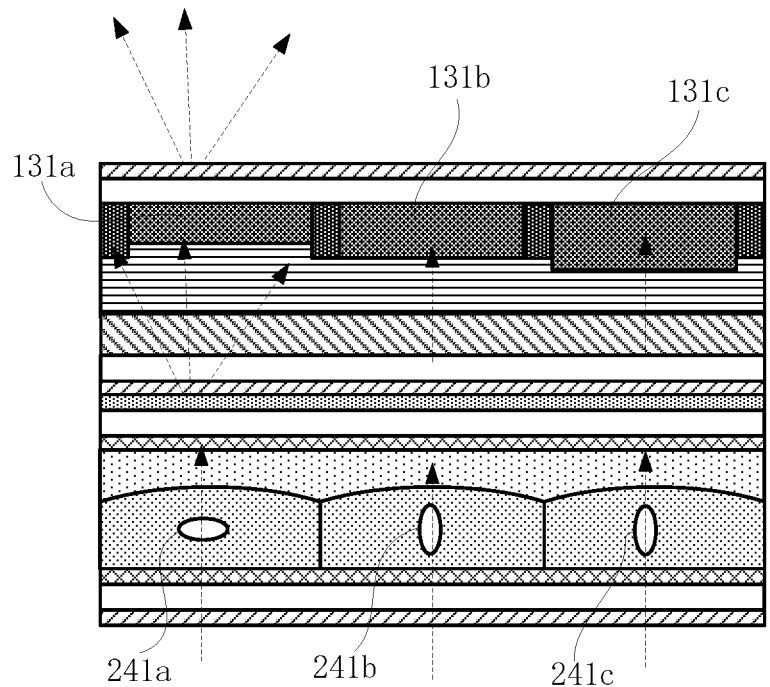
FIG. 3 is a structural schematic diagram of the display module and the first light adjusting module of the display panel under a second operation state according to the second embodiment of the present application.
Figure 4:
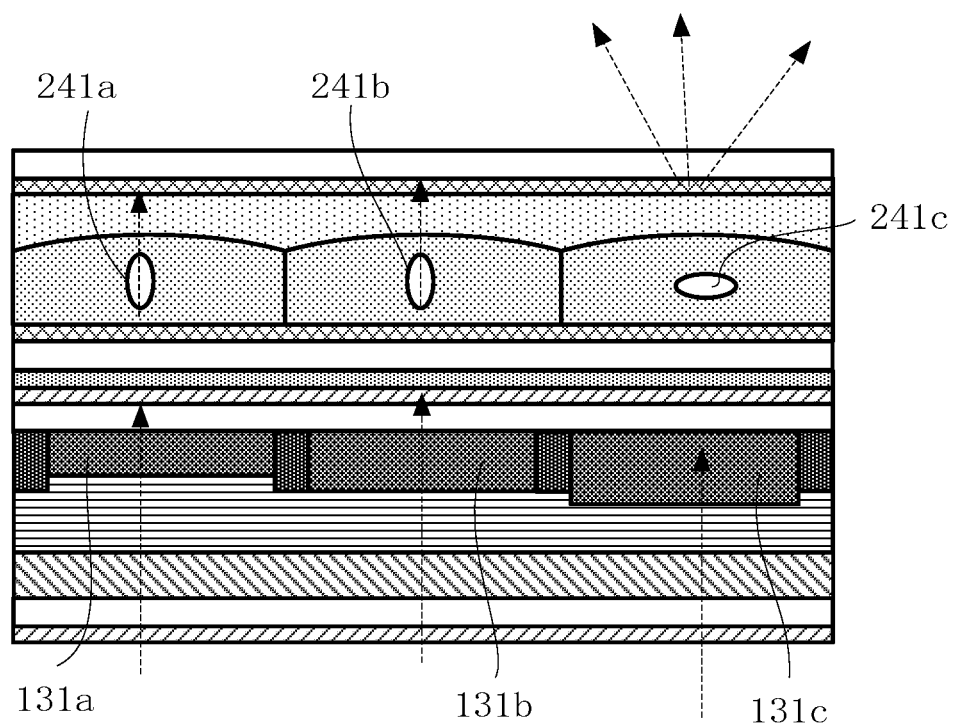
FIG. 4 is a structural schematic diagram of the display module and the first light adjusting module of the display panel under a third operation state according to the second embodiment of the present application.

As shown in FIGS. 2-4, the display panel provided in this embodiment is an improvement on the display panel provided in the above-mentioned first embodiment, and the technical contents disclosed in the first embodiment also belong to the technical contents disclosed in this embodiment.

In the first embodiment, one filler group is correspondingly arranged for each pixel 130, while in this embodiment, one filler group is correspondingly arranged for each sub-pixel 131. That is, a plurality of filler groups are correspondingly arranged for each pixel unit, and the number of the filler groups is equal to the number of sub-pixels 131, and the filler groups and sub-pixels 131 are respectively arranged correspondingly to each other. The configurations of other structures in this embodiment are in the same manner as those of the corresponding structures in the first embodiment.

Specifically, the display panel provided in the present embodiment includes a display module 100 and a first light adjusting module 200 facing each other along the first direction. The first light adjusting module 200 is disposed on an incident side of the display module 100, namely the light enters and passes through the first light adjusting module 200, and then enters the display module 100. The display module 100 includes a pixel unit having a plurality of pixels 130, and each one of the pixels 130 includes a plurality of sub-pixels 131. The first light adjusting module 200 includes a first light-adjusting electrode layer 220, a second light-adjusting electrode layer 250, a first filling layer 230 and a second filling layer 240. The second light-adjusting electrode layer 250, the second filling layer 240, the first filling layer 230 and the first light-adjusting electrode layer 220 are disposed in sequence from the incident side to the light-exiting side of the first light adjusting module 200.

The first filling layer 230 is filled with a first filling material having a refractive index of ns. The second filling layer 240 is filled with a second filling material, and the second filling material includes a plurality of filler groups. Each one of the pixels 130 corresponds to at least one filler group, and each one of the filler groups includes at least one filler 241. The refractive index of the filler 241 along the second direction is ne, and the refractive index of the filler 241 along the third direction is no. Specifically, ne>no, and ns≈no, where ns may exactly equal to no, or, the difference between ns and no is negligible, so that the light passing through the structure with a refractive index of ns and the structure with a refractive index of no in sequence is not refracted. The electric field formed between the first light-adjusting electrode layer 220 and the second light-adjusting electrode layer 250 is used for driving all of the fillers 241 in the filler group corresponding to the sub-pixel 131 to switch between a first deflected state and a second deflected state. While the sub-pixel 131 is in the activated state, the first light-adjusting electrode layer 220 and the second light-adjusting electrode layer 250 force all the fillers 241 in the filler group corresponding to the sub-pixel 131 to be in the first deflected state, such that the second direction of all the fillers 241 in the filler group corresponding to the sub-pixel 131 is parallel to the vibration direction of the light; while the sub-pixel 131 is in the inactivated state or the dark state, the first light-adjusting electrode layer 220 and the second light-adjusting electrode layer 250 force all the fillers 241 in the filler group corresponding to the sub-pixel 131 to be in the second deflected state, such that the third direction of all the fillers 241 in the filler group corresponding to the sub-pixel 131 is parallel to the vibration direction of the light. The first light adjusting module 200 further includes a third polarizing sheet 270 disposed on the incident side of the second light-adjusting electrode layer 250, and the transmission axis of the third polarizing sheet 270 is orthogonal to the transmission axis of the second polarizing sheet 170. The deflected state of the fillers 241 in the filler groups corresponding to different sub-pixels 131 under different operation states of the display panel is explained below with reference to FIGS. 2 to 4. In order to clearly show the deflected state of the fillers 241, the deflected state of only one of the fillers 241 in a filler group is shown, and the deflected states of all other fillers 241 in this filler group are the same as the deflected state of the one of the fillers 241.

In order to distinguish different sub-pixels 131, in FIGS. 2 to 4, the first direction is vertically upward, and the propagation direction of light is in the first direction. The third polarizing sheet 270 is horizontal polarization, namely the transmission direction of the third polarizing sheet 270 is in the horizontal direction, that is, only the light vibrating in the horizontal direction can pass through the third polarizing sheet 270. The three sub-pixels 131 are referred as a first sub-pixel 131a, a second sub-pixel 131b and a third sub-pixel 131c from left to right, respectively. The filler in the filler group corresponding to the first sub-pixel 131a is the first filler 241a, the filler in the filler group corresponding to the second sub-pixel 131b is the second filler 241b, and the filler in the filler group corresponding to the third sub-pixel 131c is the third filler 241c.

In an operation state shown in FIG. 2, the first sub-pixel 131a and the third sub-pixel 131c are in the inactivated state, and the second sub-pixel 131b is in the activated state. Accordingly, under the action of the electric field between the first light-adjusting electrode layer 220 and the second light-adjusting electrode layer 250, the third directions of both the first filler 241a and the third filler 241c are parallel to the horizontal direction, that is, the third directions of the first filler 241a and the third filler 241c are both parallel to the vibration direction of the light passing through the second filling layer 240, therefore, the refractive indices of the first filler 241a and the third filler 241c with respect to the light passing through the second filling layer 240 are both no. The third direction of the second filler 241b is extended in the vertical direction, and the second direction is parallel to the vibration direction of the light passing through the second filling layer 240, that is, the refractive index of the second filler 241 with respect to the light passing through the second filling layer 240 is ne. With this arrangement, a range of the light emitted from the display panel via the region corresponding to the second sub-pixel 131b is expanded, thereby realizing a wide-angle display in the display region corresponding to the second sub-pixel 131b.

In an operation state shown in FIG. 3, the first sub-pixel 131a is in the activated state, and the second sub-pixel 131b and the third sub-pixel 131c are in the inactivated state. Accordingly, under the action of the electric field been the first light-adjusting electrode layer 220 and the second light-adjusting electrode layer 250, the second direction of the first filler 241a is parallel to the vibration direction of the light passing through the second filling layer 240, and the third directions of the second filler 241b and the third filler 241c are both parallel to the vibration direction of the light passing through the second filling layer 240. With this arrangement, a range of the light emitted from the display panel via the region corresponding to the first sub-pixel 131a is expanded, thereby realizing a wide-angle display in the display region corresponding to the first sub-pixel 131a.

In an operation state shown in FIG. 4, the first sub-pixel 131a and the third sub-pixel 131c are in the activated state, and the second sub-pixel 131b is in the inactivated state. Accordingly, under the action of the electric field between the first light-adjusting electrode layer 220 and the second light-adjusting electrode layer 250, the second directions of the first filler 241a and the third filler 241c are both parallel to the horizontal direction, that is, the second directions of the first filler 241a and the third filler 241c are both parallel to the vibration direction of the light passing through the second filling layer 240, therefore, the refractive indices of the first filler 241a and the third filler 241c with respect to the light passing through the second filling layer 240 are both ne. The third direction of the second filler 241b is parallel to the horizontal direction, that is, the third direction of the second filler 241b is parallel to the vibration direction of the light passing through the second filling layer 240, therefore, the refractive index of the second filler 241b with respect to the light passing through the second filling layer 240 is no. With this arrangement, a range of light emitted from the display panel via the corresponding regions of the first sub-pixel 131a and the third sub-pixel 131c is expanded, thereby realizing a wide-angle display in the display regions corresponding to the first sub-pixel 131a and the third sub-pixel 131c.

A plurality of accommodating grooves 231 are formed by the first filling material, each one of the accommodating grooves 231 is arranged corresponding to each of the sub-pixel 131, and is used for accommodate one filler group, and the filler group includes one or more fillers 241.

Third Embodiment

As shown in FIGS. 5 to 8, the display panel provided in this embodiment is an improvement on the display panel provided by the first embodiment or the second embodiment, and the technical contents disclosed in the first embodiment and the second embodiment also belong to the technical contents disclosed in this embodiment.

In the first embodiment and the second embodiment, the first light adjusting module is located on the incident side of the display module, while in this embodiment, the first light adjusting module is located on a light-exiting side of the display module.

Figure 5:
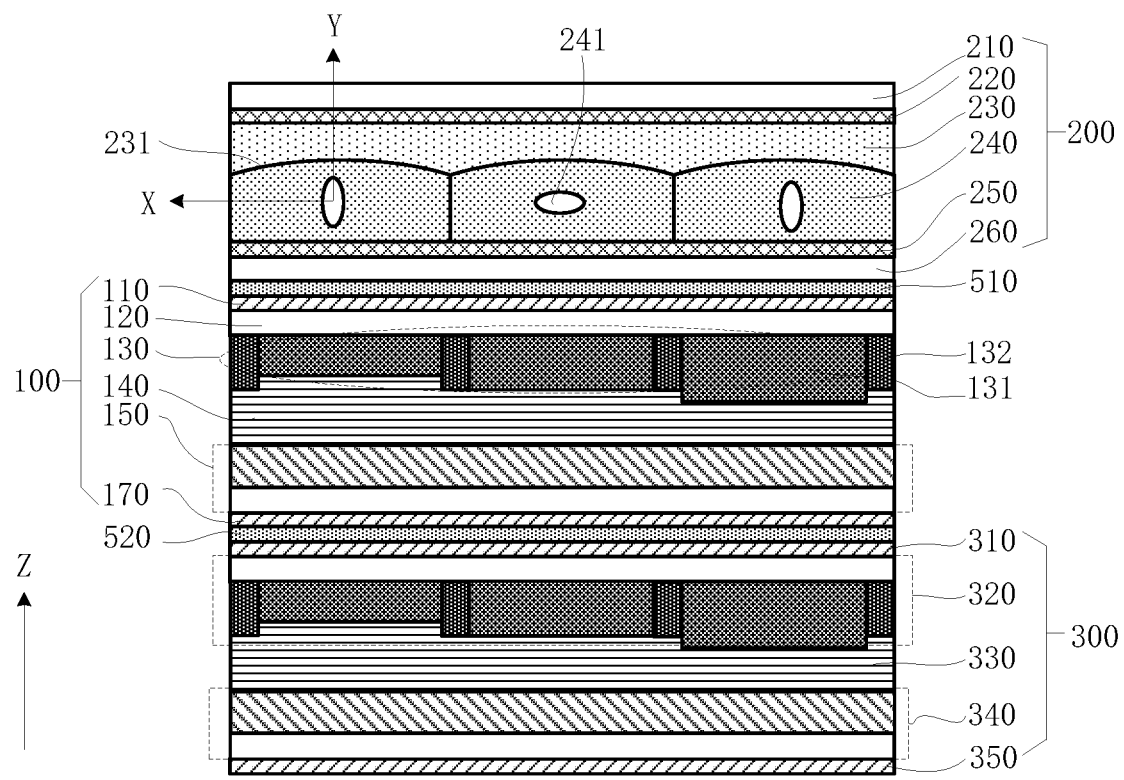
FIG. 5 is a structural schematic diagram of a display panel according to a third embodiment of the present application.

Specifically, the display panel provided in the present embodiment includes a display module 100 and a first light adjusting module 200 disposed on the light-exiting side of the display module 100. The display module 100 includes a pixel unit having a plurality of pixels 130, and each one of the pixels 130 includes a plurality of sub-pixels 131. The display module and the first light adjusting module are arranged along the first direction. In FIG. 5, the first direction is indicated by the arrow Z, namely the first direction is the light-exiting direction from the backlight source.

The first light adjusting module 200 includes a first light-adjusting electrode layer 220, a second light-adjusting electrode layer 250, a first filling layer 230 and a second filling layer 240. The second filling layer 240 is disposed on an incident side of the first filling layer 230, and the first light-adjusting electrode layer 220 and the second light-adjusting electrode layer 250 are respectively located on two sides of the second filling layer 240. Specifically, the first light-adjusting electrode layer 220, the first filling layer 230, the second filling layer 240 and the second light-adjusting electrode layer 250 may be sequentially arranged along the first direction. That is, the first filling layer 230 and the second filling layer 240 are both disposed between the first light-adjusting electrode layer 220 and the second light-adjusting electrode layer 250. Alternatively, the first filling layer 230, the first light-adjusting electrode layer 220, the second filling layer 240 and the second light-adjusting electrode layer 250 may be arranged in sequence along the first direction. That is, only the second filling layer 240 is disposed the between the first light-adjusting electrode layer 220 and the second light-adjusting electrode layer 250. The first filling layer 230 is filled with a first filling material having a refractive index of ns, and the second filling layer 240 is filled with a second filling material.

The second filling material includes a plurality of filler groups. Each one of the pixels 130 corresponds to at least one of the filler groups, and each one of the filler groups includes at least one filler 241 which is anisotropic. The refractive index of the filler 241 with respect to light passing therethrough in the same direction varies according to different deflection angles of the filler 241. The refractive index of the filler 241 along the second direction is ne, and the refractive index of the filler 241 along the third direction is no, where ne>no, and ns≈no.

The electric field formed between the first light-adjusting electrode layer 220 and the second light-adjusting electrode layer 250 is used for driving all fillers 241 in a filler group corresponding to a pixel 130 to switch between a first deflected state and a second deflected state. The second direction of the filler 241 is parallel to the vibration direction of light passing through the second filling layer 240 when in the first deflected state, and the third direction of the filler 241 is parallel to the vibration direction of the light passing through the second filling layer 240 when in the second deflected state.

In the present embodiment, the number of filler groups corresponding to one pixel 130 is the same as the number of sub-pixels 131 included in the one pixel 130, namely one filler group is arranged corresponding to each sub-pixel 131.

The electric field formed between the first light-adjusting electrode layer 220 and the second light-adjusting electrode layer 250 is used for driving all of the fillers 241 in the filler group corresponding to the sub-pixel 131 to switch between a first deflected state and a second deflected state when the activation state of the sub-pixel changes.

The electric field formed between the first light-adjusting electrode layer 220 and the second light-adjusting electrode layer 250 is used for driving all of the fillers 241 in the filler group corresponding to the sub-pixel 131 to switch between the first deflected state and the second deflected state. Specifically, while the sub-pixel 131 is in an activated state, the first light-adjusting electrode layer 220 and the second light-adjusting electrode layer 250 force all the fillers 241 in the filler group corresponding to the sub-pixel 131 to be in the first deflected state, such that the second direction of all the fillers 241 in the filler group corresponding to the sub-pixel 131 is parallel to the vibration direction of the light passing through the second filling layer 240; while the sub-pixel 131 is in an inactivated state or a dark state, the first light-adjusting electrode layer 220 and the second light-adjusting electrode layer 250 force all the fillers 241 in the filler group corresponding to the sub-pixel 131 to be in the second deflected state, such that the third direction of all the fillers 241 in the filler group corresponding to the sub-pixel 131 is parallel to the vibration direction of the light passing through the second filling layer 240. In FIG. 5, the second direction and the third direction of one of the fillers 241 are indicated by arrows, the second direction of the filler 241 is the direction indicated by the arrow Y, and the third direction is the direction indicated by the arrow X. That is, the second direction is along the direction of a long axis, and the third direction is along the direction of a short axis direction when the cross section of the filler 241 is in an elliptical shape.

Through this configuration, the electric field can be adjusted through the first light-adjusting electrode layer 220 and the second light-adjusting electrode layer 250, so that the fillers 241 in the filler groups corresponding to the sub-pixels 131 under different states are able to be deflected by different angles or the same angle. The light is allowed to be adjusted at a scale of the sub-pixels 131, thus the light corresponding to the activated sub-pixels 131 can be emitted at a wide angle, and the light corresponding to the inactivated sub-pixels 131 is not refracted to avoid light leakage.

Figure 11:
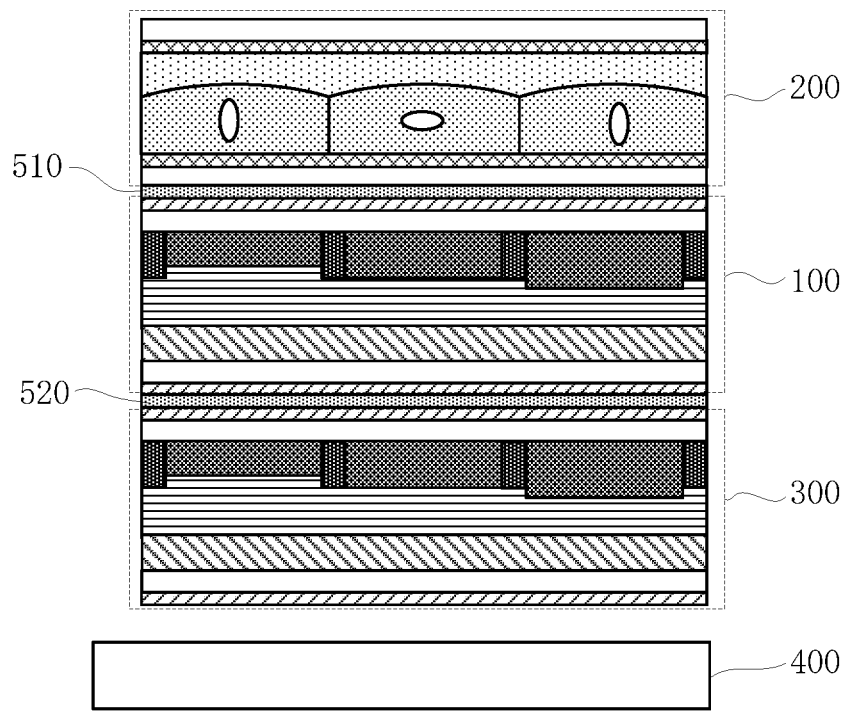
FIG. 11 is a structural schematic diagram of another display device according to the fifth embodiment of the present application.

The display panel provided in this embodiment is applicable in a display device, as shown in FIG. 11. A better effect can be obtained by combination of the display device with a collimated light source 400. Light leakage can be reduced due to the narrow incident angle of the collimated light source. The incident light onto the activated pixel 130 is refracted and emitted at a wide-angle through the display panel, thereby realizing a wide-angle display.

Furthermore, in this embodiment, a privacy-protection function can also be implemented through the first light adjusting module. Specifically, the first light adjusting module may be used as a switch for privacy-protection display at the scale of the pixel 130 or the sub-pixel 131. When privacy protection is needed for one or more sub-pixels 131, the electric field is controlled by the first light-adjusting electrode layer 220 and the second light-adjusting electrode layer 250, so that the fillers 241 in the filler group corresponding to the pixel 130 or sub-pixel 131 needing privacy protection is deflected into the second deflected state. Accordingly, the light passing through the first filling layer 230 and the second filling layer 240 is not refracted, so that the light is emitted along the original optical path without expanding the range of light emission, therefore, a relatively small viewing angle is maintained to realize the privacy protection on the scale of the pixel 130 or the sub-pixel 131.

Where privacy protection is not needed, the electric field is controlled by the first light-adjusting electrode layer 220 and the second light-adjusting electrode layer 250, so that the fillers 241 in the filler group corresponding to the pixel 130 or sub-pixel 131 not requiring privacy protection is deflected into the first deflected state. Accordingly, the light passing through the first filling layer 230 and the second filling layer 240 is refracted, thereby expanding the range of the light emission, therefore, a relatively large viewing angle is maintained on the display device to achieve the wide-angle display on the scale of the pixel 130 or the sub-pixel 131, which is non-privacy display.

In FIG. 5, the display module 100 includes a first color film substrate 160 and a first array substrate 150. The first color film substrate 160 includes a third transparent substrate 120 and a pixel unit disposed on the third transparent substrate 120. The pixel unit includes a plurality of pixels 130. One pixel 130 includes three sub-pixels 131 as in FIG. 5. A black matrix 132 is disposed on the third transparent substrate 120, for defining a display area and a non-display area on the third transparent substrate 120. The area blocked by the black matrix 132 is the non-display area, and the area not blocked by the black matrix 132 is the display area, and the sub-pixels 131 are arranged in the display area. The first array substrate 150 includes a fourth transparent substrate 152 and an array layer 151, and the array layer 151 includes a metal and semiconductor element which is disposed on the fourth transparent substrate 152. A liquid-crystal display layer 140 is filled between the first color film substrate 160 and the first array substrate 150.

Furthermore, the display module 100 further includes a first polarizing sheet 110 and a second polarizing sheet 170. The first polarizing sheet 110 is disposed on the light-exiting side of the pixel unit, and the second polarizing sheet 170 is disposed on the incident side of the pixel unit. Specifically, the first polarizing sheet 110 is disposed on the light-exiting side of the third transparent substrate 120, and the second polarizing sheet 170 is disposed on the incident side of the fourth transparent substrate 152.

In an embodiment, the transmission direction of the first polarizing sheet 110 is in the horizontal direction, in other words, the first polarizing sheet 110 is horizontal polarization, so that the light vibrating in the horizontal direction is able to pass through the first polarizing sheet 110 and enter the first light adjusting module 200.

The deflected state of the fillers 241 in the filler groups corresponding to different sub-pixels 131 under different operation states of the display panel is explained below with reference to FIGS. 6 to 8. In order to clearly show the deflected state of the fillers 241, the deflected state of only one of the fillers 241 in a filler group is shown, and the deflected states of all other fillers 241 in this filler group are the same as the deflected state of the one of the fillers 241.

Figure 6:
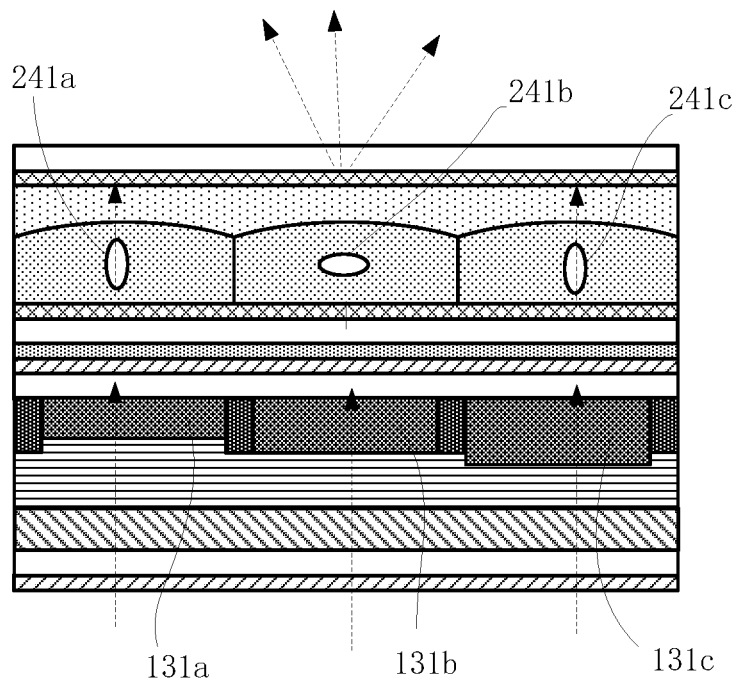
FIG. 6 is a structural schematic diagram of the display module and the first light adjusting module of the display panel under the first operation state according to the third embodiment of the present application.
Figure 7:
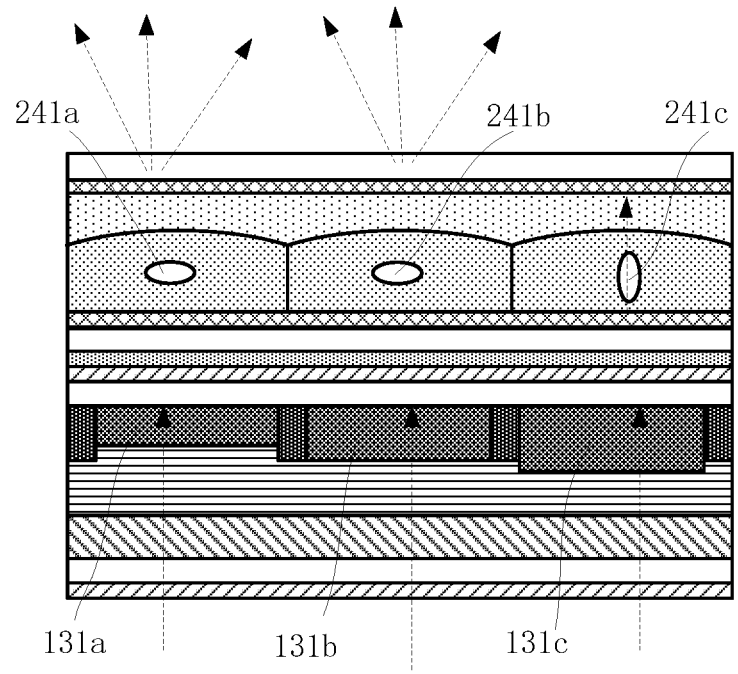
FIG. 7 is a structural schematic diagram of the display module and the first light adjusting module of the display panel under the second operation state according to the third embodiment of the present application.
Figure 8:
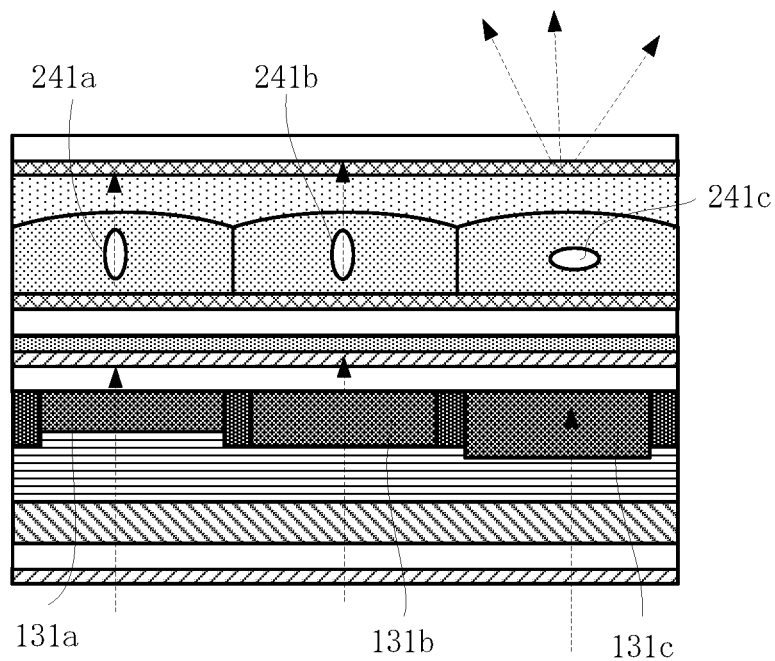
FIG. 8 is a structural schematic diagram of the display module and the first light adjusting module of the display panel under the third operation state according to the third embodiment of the present application.

In order to distinguish different sub-pixels 131, in FIGS. 6 to 8, the first direction is vertically upward, and the propagation direction of light is in the first direction. The first polarizing sheet 110 is horizontal polarization, so that only the light vibrating in the horizontal direction is able to pass through the first polarizing sheet 110 and enter the first light adjusting module 200. The three sub-pixels 131 are referred as a first sub-pixel 131a, a second sub-pixel 131b and a third sub-pixel 131c from left to right, respectively. The filler in the filler group corresponding to the first sub-pixel 131a is the first filler 241a, the filler in the filler group corresponding to the second sub-pixel 131b is the second filler 241b, and the filler in the filler group corresponding to the third sub-pixel 131c is the third filler 241c.

In an operation state shown in FIG. 6, the first sub-pixel 131a and the third sub-pixel 131c are in the inactivated state, and the second sub-pixel 131b is in the activated state. Accordingly, under the action of the electric field between the first light-adjusting electrode layer 220 and the second light-adjusting electrode layer 250, the third directions of both the first filler 241a and the third filler 241c are parallel to the horizontal direction, that is, the third directions of the first filler 241a and the third filler 241c are both parallel to the vibration direction of the light entering the second filling layer 240. The second direction of the second filler 241b is parallel to the horizontal direction, namely the second direction is parallel to the vibration direction of the light entering the second filling layer 240. Through this arrangement, a range of the light emitted from the display panel via the region corresponding to the second sub-pixel 131b is expanded, thereby realizing a wide-angle display in the display region corresponding to the second sub-pixel 131b.

In an operation state shown in FIG. 7, the first sub-pixel 131a and the second sub-pixel 131b are in the activated state, and the third sub-pixel 131c is in the inactivated state. Accordingly, under the action of the electric field between the first light-adjusting electrode layer 220 and the second light-adjusting electrode layer 250, the second directions of the first filler 241a and the second filler 241b are both parallel to the vibration direction of the light entering the second filling layer 240, and the third direction of the third filler 241c is parallel to the vibration direction of the light entering the second filling layer 240. Through this arrangement, a range of the light emitted from the display panel via the regions corresponding to the first sub-pixel 131a and the second sub-pixel 131b is expanded, thereby realizing a wide-angle display in the display regions corresponding to the first sub-pixel 131a and the second sub-pixel 131b.

In an operation state shown in FIG. 8 the third sub-pixel 131c is in the activated state, and the first sub-pixel 131a and the second sub-pixel 131b are in the inactivated state. Accordingly, under the action of the electric field between the first light-adjusting electrode layer 220 and the second light-adjusting electrode layer 250, the second direction of the third filler 241c is parallel to the vibration direction of the light entering the second filling layer 240, and the third directions of the first filler 241a and the second filler 241b are both parallel to the vibration direction of the light entering the second filling layer 240. Through this arrangement, a range of the light emitted from the display panel via the region corresponding to the third sub-pixel 131c is expanded, thereby realizing a wide-angle display in the display region corresponding to the third sub-pixel 131c.

As shown in FIG. 5, in an embodiment, the display panel further includes a second light adjusting module 300 disposed on the incident side of the display module 100, and the second light adjusting module 300 is used for adjusting the luminance of the light entering the display module 100.

In an embodiment, the structure of the second light adjusting module 300 is the same as that of the display module 100. The second light adjusting module 300 includes a third polarizing sheet 310, a fourth polarizing sheet 350, a second color film substrate 320 and a second array substrate 340. A second liquid crystal display layer 330 is filled between the second color film substrate 320 and the second array substrate 340. The third polarizing sheet 310 is disposed on the light-exiting side of the second color film substrate 320, and the fourth polarizing sheet 350 is disposed on the incident side of the second array substrate 340.

In an embodiment, a plurality of accommodating grooves 231 are formed by the first filling material, each being used for accommodating one filler group. As shown in FIG. 1, one accommodating groove 231 is arranged corresponding to one sub-pixel 131 in the first filling layer 230, and the accommodating groove 231 is used for accommodating the filler group corresponding to the sub-pixel 131.

In order to control different filler groups, the first light-adjusting electrode layer 220 includes a plurality of first electrodes, and the second light-adjusting electrode layer 250 includes a plurality of second electrodes. At least one first electrode and at least one second electrode are respectively disposed on two sides of a filler group, and the electric field in the area of the filler group is controlled by the corresponding first and the second electrodes, so that a more precise control of the filler 241 in the filler group can be achieved. The first electrode and the second electrode may be an ITO conductive electrode.

The first light adjusting module 200 further includes a first transparent substrate 210 and a second transparent substrate 260, the first light-adjusting electrode layer 220 is mounted on the first transparent substrate 210, and the second light-adjusting electrode layer 250 is mounted on the second transparent substrate 260. Specifically, the first transparent substrate 210 is located on the light-exiting side of the first light-adjusting electrode layer 220, and the second transparent substrate 260 is located on the incident side of the second light-adjusting electrode layer 250.

The value of ne is in a range of 1.0-2.5, the value of no is in a range of 1.0-2.5, and the difference between ne and no is in a range of 0.01-2, namely the value obtained by subtracting no from ne falls in the range of 0.01-2.

The second filling material includes uniaxial materials having different refractive indices with respect to different directions, and the refractive index of the uniaxial materials varies according to different deflection angles.

Optionally, the second filling material is a nematic liquid crystal molecule material, and the fillers 241 are liquid crystal molecules showing anisotropy. The direction along a long axis of the liquid crystal molecules is the second direction, and the direction along a short axis of the liquid crystal molecules is the third direction.

In this embodiment, the first transparent substrate 210, the second transparent substrate 260, the third transparent substrate 120 and the fourth transparent substrate 152 may all be a glass plate.

In the present application, the display module 100 and the first light adjusting module 200 are adhered by a first adhesive layer 510, and the display module 100 and the second light adjusting module 300 are adhered by a second adhesive layer 520. The first adhesive layer 510 and the second adhesive layer 520 may both use an OCA.

In an embodiment shown in FIG. 5, the first adhesive layer 510 is located between the second transparent substrate 260 and the first polarizing sheet 110, and the second adhesive layer 520 is located between the second polarizing sheet 170 and the third polarizing sheet 310.

Fourth Embodiment

Figure 9:
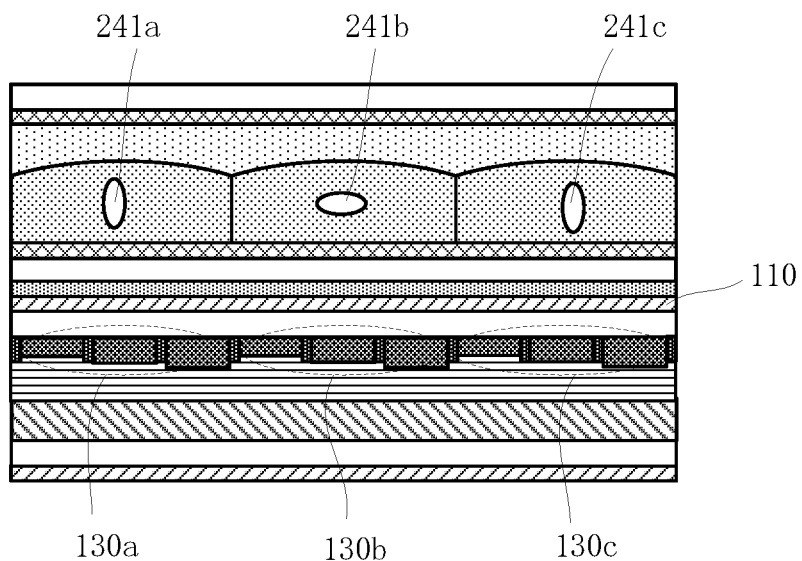
FIG. 9 is a structural schematic diagram of the display module and the first light adjusting module of the display panel according to a fourth embodiment of the present application.

As shown in FIG. 9, the display panel provided by this embodiment is an improvement on the display panel provided by the third embodiment, and the technical contents disclosed in the third embodiment also belong to the technical contents disclosed in this embodiment.

In the third embodiment, one filler group is arranged corresponding to each pixel 130, while in this embodiment, one filler group is arranged corresponding to each sub-pixel 131. That is, a plurality of filler groups are arranged correspondingly to each pixel unit, so that the number of the filler groups is equal to the number of the sub-pixels 131, and each of the filler groups is corresponding to each of the sub-pixels 131. The arrangement of other structures in this embodiment are the same as that of the corresponding structures in the third embodiment.

Specifically, the display panel provided in this embodiment includes a display module 100 and a first light adjusting module 200 which are disposed along a first direction. The first light adjusting module 200 is located on the light-exiting side of the display module 100, so that the light enters and passes through the display module 100, and then enters the first light adjusting module 200.

The display module 100 includes a pixel unit having a plurality of pixels 130, and each of the pixels 130 includes a plurality of sub-pixels 131. Only three pixels 130 in the pixel unit are shown in FIG. 9, each including three sub-pixels 131.

The first light adjusting module 200 includes a first light-adjusting electrode layer 220, a second light-adjusting electrode layer 250, a first filling layer 230 and a second filling layer 240. The second light-adjusting electrode layer 250, the second filling layer 240, the first filling layer 230 and the first light-adjusting electrode layer 220 are disposed in sequence from the incident side to the light-exiting side of the first light adjusting module 200.

The first filling layer 230 is filled with a first filling material having a refractive index of ns. The second filling layer 240 is filled with a second filling material.

The second filling material includes a plurality of filler groups. Each one of the pixels 130 corresponds to at least one of the filler groups, and each one of the filler groups includes at least one filler 241 which is anisotropic. The refractive index of the filler 241 with respect to light passing therethrough in the same direction varies according to different deflection angles of the filler 241. The refractive index of the filler 241 along the second direction is ne, and the refractive index of the filler 241 along the third direction is no, where ne>no, and ns≈no.

The electric field formed between the first light-adjusting electrode layer 220 and the second light-adjusting electrode layer 250 is used for driving all fillers 241 in the filler groups corresponding to the pixel 130 to switch between a first deflected state and a second deflected state. Specifically, all the fillers 241 in the filler groups corresponding to the pixel 130 are forced into the first deflected state with the second directions thereof parallel to the first direction by the first light-adjusting electrode layer 220 and the second light-adjusting electrode layer 250, when the pixel 130 is in the activated state; and all the fillers 241 in the filler groups corresponding to the pixel 130 are forced into the second deflected state with the third directions thereof parallel to the first direction by the first light-adjusting electrode layer 220 and the second light-adjusting electrode layer 250, when the pixel 130 is in the inactivated state or the dark state.

In FIG. 9, the display module 100 includes a first polarizing sheet 110 disposed on the light-exiting side of the pixel unit. In an embodiment, the transmission direction of the first polarizing sheet 110 is in the horizontal direction. In other words, the first polarizing sheet 110 is horizontal polarization, and the light vibrating in the horizontal direction is able to pass through the first polarizing sheet 110 and enter the first light adjusting module 200.

As shown in FIG. 9, for example, in order to demonstrate the deflection angle of the fillers 241, only one filler 241 is shown in a filler group, and the deflection angle of the one filler 241 represents the deflection angles of all the fillers 241 in the filler group.

In FIG. 9, one pixel 130 includes three sub-pixels 131. Three pixels 130 are shown in FIG. 9, and one filler group is correspondingly arranged with respect to each pixel 130. The cross section of the fillers 241 in the filler group is in an elliptical shape, and the direction along a long axis thereof is the second direction, and the direction along a short axis thereof is the third direction. For the ease of explanation, the three pixels 130 in FIG. 9 are referred as a first pixel 130a, a second pixel 130b and a third pixel 130c from left to right, respectively. The filler in the filler group corresponding to the first pixel 130a is the first filler 241a, the filler in the filler group corresponding to the second pixel 130b is the second filler 241b, and the filler in the filler group corresponding to the third pixel 130c is the third filler 241c.

Fifth Embodiment

Figure 10:
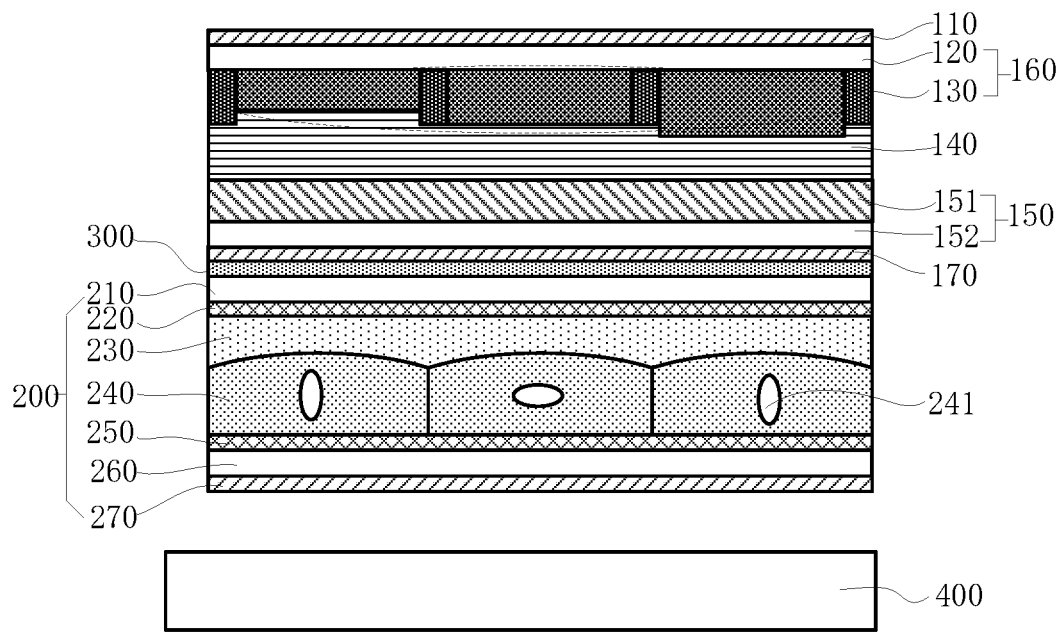
FIG. 10 is a structural schematic diagram of a display device according to a fifth embodiment of the present application.

As shown in FIGS. 10 to 14, a display device including a backlight source and a display panel is provided by the present embodiment. The backlight source is located on an incident side of the display panel, and the backlight source is a collimated light source. Specifically, the display panel may be the display panel provided in any of the abovementioned first to fourth embodiments. For example, the display device in FIG. 10 is implemented with the display panel provided by the second embodiment, and the display device in FIG. 11 is implemented with the display panel provided by the third embodiment.

Figure 12:
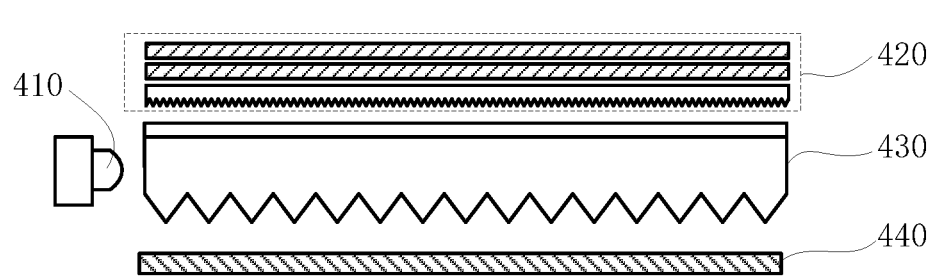
FIG. 12 is a structural schematic diagram of a backlight source in the display device according to the fifth embodiment of the present application.

As shown in FIG. 12, optionally, the backlight source 400 includes a light source 410, an optical film 420, a light-guiding plate 430 and a reflective sheet 440. The optical film 420 is located between the light-guiding plate 430 and the display panel. The light source 410 is disposed to a side of the light-guiding plate 430, and the reflective sheet 440 is located on a side of the light-guiding plate 430 facing away from the display panel. The light source 410 may be an LED light source.

Optionally, the optical film 420 includes a plurality of optical sheets, and an optical sheet facing the light-guiding plate 430 among the plurality of optical sheets is configured to have an inversed prism structure. In other words, an optical sheet facing the light-guiding plate 430 is provided with a plurality of prism structures on a side face of the optical sheet that faces toward the light-guiding plate 430.

Figure 13:
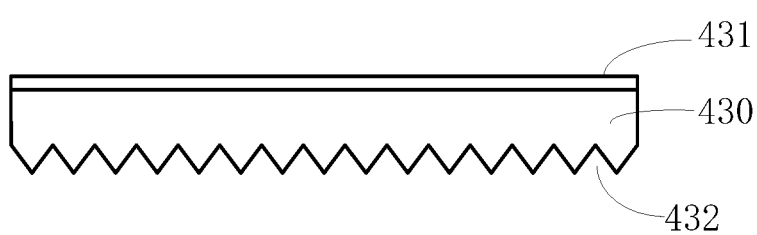
FIG. 13 is a structural schematic diagram of a light-guiding plate in the display device viewed from a first viewing angle according to the fifth embodiment of the present application.
Figure 14:
FIG. 14 is a structural schematic diagram of the light-guiding plate in the display device viewed from a second viewing angle according to the fifth embodiment of the present application.

Optionally, as shown in FIG. 13 and FIG. 14, a plurality of first V-shaped grooves 431 arranged side by side are provided on a side face of the light-guiding plate 430 facing the optical film 420, and a plurality of second V-shaped grooves 432 arranged side by side are provided on the side face of the light-guiding plate 430 facing the reflective sheet 440. An extending direction of the first V-shaped grooves 431 is parallel to an emission direction of the light from the light source 410, and an extending direction of the second V-shaped grooves 432 is perpendicular to the extending direction of the first V-shaped grooves 431.

The plurality of second V-shaped grooves 432 are shown, and only an outer sidewall of a first V-shaped groove 431 located on the outermost edge is shown from the viewing angle as shown in FIG. 13. The plurality of first V-shaped grooves 431 are shown, and only an outer sidewall of a second V-shaped groove 432 located on the outermost edge is shown from the viewing angle as shown in FIG. 14. FIG. 14 is obtained by rotating the light-guiding plate 430 shown in FIG. 13 by 90° in the horizontal plane.

The above are merely optional embodiments of the present application, and are not intended to limit the present application. Any modification, equivalent replacement, and improvement made within the spirit and principle of the present application shall fall within the scope of protection of the present application.

What is claimed is:

1. A display panel, comprising:
   a first light adjusting module; and
   a display module facing the first light adjusting module along a first direction, the display module comprising a pixel unit, the pixel unit having a plurality of pixels, and each one of the plurality of pixels comprising a plurality of sub-pixels;
wherein
   the first light adjusting module comprises a first light-adjusting electrode layer, a second light-adjusting electrode layer, a first filling layer and a second filling layer, the second filling layer is disposed on an incident side of the first filling layer, and the first light-adjusting electrode layer and the second light-adjusting electrode layer are respectively located on two sides of the second filling layer, the first filling layer is filled with a first filling material with a refractive index of ns, and the second filling layer is filled with a second filling material;
   the second filling material comprises a plurality of filler groups, and one of the plurality of pixels corresponds to at least one of the plurality of filler groups, each one of the plurality of filler groups comprises at least one filler, and the filler has a refractive index of ne along a second direction, and a refractive index of no along a third direction, where ne>no, and ns≈no;
   an electric field for switching a state of the filler in the plurality of filler groups corresponding to the plurality of pixels is formed between the first light-adjusting electrode layer and the second light-adjusting electrode layer, the state of the filler comprises at least a first deflected state and a second deflected state, the second direction of the filler coincides with a vibration direction of an incident light entering the second filling layer in a case that the filler is in the first deflected state, and the third direction of the filler coincides with the vibration direction of the incident light entering the second filling layer in a case that the filler is in the second deflected state;
   the number of the plurality of filler groups corresponding to one of the plurality of pixels is the same as the number of the plurality of sub-pixels in the one of the plurality of pixels, namely each of the plurality of sub-pixels corresponds to one of the plurality of filler groups; and
   the electric field formed between the first light-adjusting electrode layer and the second light-adjusting electrode layer is used for driving the filler in a respective one of the plurality of the filler groups to switch between the first deflected state and the second deflected state in a case that an activated state of one of the plurality of sub-pixels is changed.

2. The display panel according to claim 1, wherein the first filling material is formed with a plurality of accommodating grooves, and each one of the plurality of accommodating grooves is used for accommodating one of the plurality of filler groups.

3. The display panel according to claim 2, wherein the first light adjusting module is disposed on a light-exiting side of the display module, and the display panel further comprises a second light adjusting module disposed on an incident side of the display module, and the second light adjusting module is configured for adjusting a luminance of the light entering the display module.

4. The display panel according to claim 1, wherein a difference value between ne and no is in a range of 0.01-2, with a value of ne between 1.0 and 2.5, and a value of no between 1.0 and 2.5.

5. The display panel according to claim 4, wherein the first light adjusting module is disposed on a light-exiting side of the display module, and the display panel further comprises a second light adjusting module disposed on an incident side of the display module, and the second light adjusting module is configured for adjusting a luminance of the light entering the display module.

6. The display panel according to claim 1, wherein the first filling material is a polymer material, the second filling material is a nematic liquid-crystal-molecule material, and the filler is a liquid crystal molecule.

7. The display panel according to claim 6, wherein the first light adjusting module is disposed on a light-exiting side of the display module, and the display panel further comprises a second light adjusting module disposed on an incident side of the display module, and the second light adjusting module is configured for adjusting a luminance of the light entering the display module.

8. The display panel according to claim 1, wherein the first light adjusting module further comprises a first transparent substrate and a second transparent substrate, the first transparent substrate is located on a light-exiting side of the first light-adjusting electrode layer, and the second transparent substrate is located on an incident side of the second light-adjusting electrode layer.

9. The display panel according to claim 8, wherein the first light adjusting module is disposed on a light-exiting side of the display module, and the display panel further comprises a second light adjusting module disposed on an incident side of the display module, and the second light adjusting module is configured for adjusting a luminance of the light entering the display module.

10. The display panel according to claim 1, wherein the first light adjusting module is disposed on a light-exiting side of the display module, and the display panel further comprises a second light adjusting module disposed on an incident side of the display module, and the second light adjusting module is configured for adjusting a luminance of the light entering the display module.

11. A display device, comprising: a backlight source and the display panel according to claim 1,
wherein the backlight source is disposed on an incident side of the display panel, and the backlight source is a collimated light source.

12. The display device according to claim 11, wherein the backlight source comprises: light source, an optical film, a light-guiding plate and a reflective sheet;
the optical film is located between the light-guiding plate and the display panel, the light source is disposed to a side of the light-guiding plate, and the reflective sheet is located on a side of the light-guiding plate facing away from the display panel;
a plurality of first V-shaped grooves arranged side by side are provided on a side of the light-guiding plate facing the optical film, and a plurality of second V-shaped grooves arranged side by side are provided on the side of the light-guiding plate facing the reflective sheet; and
the first V-shaped grooves are extended along a direction parallel to an emission direction of the light from the light source, and the second V-shaped grooves are extended along a direction perpendicular to the direction along which the first V-shaped grooves are extended.

13. A display panel, comprising:
a first light adjusting module; and
a display module facing the first light adjusting module along a first direction, the display module comprising a pixel unit, the pixel unit having a plurality of pixels, and each one of the plurality of pixels comprising a plurality of sub-pixels;
wherein
the first light adjusting module comprises a first light-adjusting electrode layer, a second light-adjusting electrode layer, a first filling layer and a second filling layer, the second filling layer is disposed on an incident side of the first filling layer, and the first light-adjusting electrode layer and the second light-adjusting electrode layer are respectively located on two sides of the second filling layer, the first filling layer is filled with a first filling material with a refractive index of ns, and the second filling layer is filled with a second filling material;
the second filling material comprises a plurality of filler groups, and one of the plurality of pixels corresponds to at least one of the plurality of filler groups, each one of the plurality of filler groups comprises at least one filler, and the filler has a refractive index of ne along a second direction, and a refractive index of no along a third direction, where ne>no, and ns≈no;
an electric field for switching a state of the filler in the plurality of filler groups corresponding to the plurality of pixels is formed between the first light-adjusting electrode layer and the second light-adjusting electrode layer, the state of the filler comprises at least a first deflected state and a second deflected state, the second direction of the filler coincides with a vibration direction of an incident light entering the second filling layer in a case that the filler is in the first deflected state, and the third direction of the filler coincides with the vibration direction of the incident light entering the second filling layer in a case that the filler is in the second deflected state;
the first light adjusting module is disposed on the incident side of the display module;
the display module comprises a first polarizing sheet and a second polarizing sheet;
the first light adjusting module comprises a third polarizing sheet;
the first polarizing sheet is positioned on a light-exiting side of the pixel unit, the second polarizing sheet is positioned on an incident side of the pixel unit, and the third polarizing sheet is positioned on an incident side of the second light-adjusting electrode layer; and a transmission axis of the third polarizing sheet is orthogonal to a transmission axis of the second polarizing sheet.

14. The display panel according to claim 13, wherein the first filling material is formed with a plurality of accommodating grooves, and each one of the plurality of accommodating grooves is used for accommodating one of the plurality of filler groups.

15. The display panel according to claim 13, wherein a difference value between ne and no is in a range of 0.01-2, with a value of ne between 1.0 and 2.5, and a value of no between 1.0 and 2.5.

16. The display panel according to claim 13, wherein the first filling material is a polymer material, the second filling material is a nematic liquid-crystal-molecule material, and the filler is a liquid crystal molecule.

17. The display panel according to claim 13, wherein the first light adjusting module further comprises a first transparent substrate and a second transparent substrate, the first transparent substrate is located on a light-exiting side of the first light-adjusting electrode layer, and the second transparent substrate is located on an incident side of the second light-adjusting electrode layer.

18. The display panel according to claim 13, wherein the number of the plurality of filler groups corresponding to one of the plurality of pixels is the same as the number of the plurality of sub-pixels in the one of the plurality of pixels, namely each of the plurality of sub-pixels corresponds to one of the plurality of filler groups; and the electric field formed between the first light-adjusting electrode layer and the second light-adjusting electrode layer is used for driving the filler in a respective one of the plurality of the filler groups to switch between the first deflected state and the second deflected state in a case that an activated state of one of the plurality of sub-pixels is changed.

* * * * *